United States Patent
Ohkubo et al.

(10) Patent No.: US 6,913,557 B2
(45) Date of Patent: Jul. 5, 2005

(54) POWER TRANSMITTING APPARATUS

(75) Inventors: Susumu Ohkubo, Wako (JP);
Nobuchika Katagiri, Wako (JP);
Yoshitaka Oota, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 61 days.

(21) Appl. No.: 10/712,149

(22) Filed: Nov. 13, 2003

(65) Prior Publication Data

US 2004/0142788 A1 Jul. 22, 2004

(30) Foreign Application Priority Data

Jan. 17, 2003 (JP) .................................. 2003-009817
Jan. 17, 2003 (JP) .................................. 2003-009828
Jan. 17, 2003 (JP) .................................. 2003-009856

(51) Int. Cl.$^7$ ............................................. F16H 57/08
(52) U.S. Cl. ...................... 475/331; 180/19.1; 172/43
(58) Field of Search ............... 475/331; 180/19.1–19.3; 172/42–43

(56) References Cited

U.S. PATENT DOCUMENTS 4,726,256 A * 2/1988 von Kaler et al. .......... 475/160
5,971,881 A * 10/1999 Jolliff .......................... 475/89

FOREIGN PATENT DOCUMENTS

JP          60040931       12/1985
JP       2002130325 A   *  5/2002   .......... F16D/19/00

* cited by examiner

Primary Examiner—Tisha Lewis
(74) Attorney, Agent, or Firm—Adams & Wilks (57) ABSTRACT

In order to minimize unwanted corotation, a gear support member is in the shape of a flat disk and has an outer diameter greater than the pitch circle of a ring gear. Further, a surface level of lubricating oil stored in a casing is set to be below the ring gear, but above the gear support member. Furthermore, a resilient clip is resiliently fitted on an output shaft and gear support member, and the resilient clip has at least one end supported by the casing. In addition, the casing has, on its bottom, a frictional surface for sliding contact with the lower surface of the gear support member.

5 Claims, 12 Drawing Sheets

POWER TRANSMITTING APPARATUS

FIELD OF THE INVENTION

The present invention relates to power transmitting apparatus using planetary gears.

BACKGROUND OF THE INVENTION

There have been known power transmitting apparatus of a type which, through a combination of sun, planetary and ring gears, can switch between a power-transmitting mode and a non-power-transmitting mode.

Figure 12:
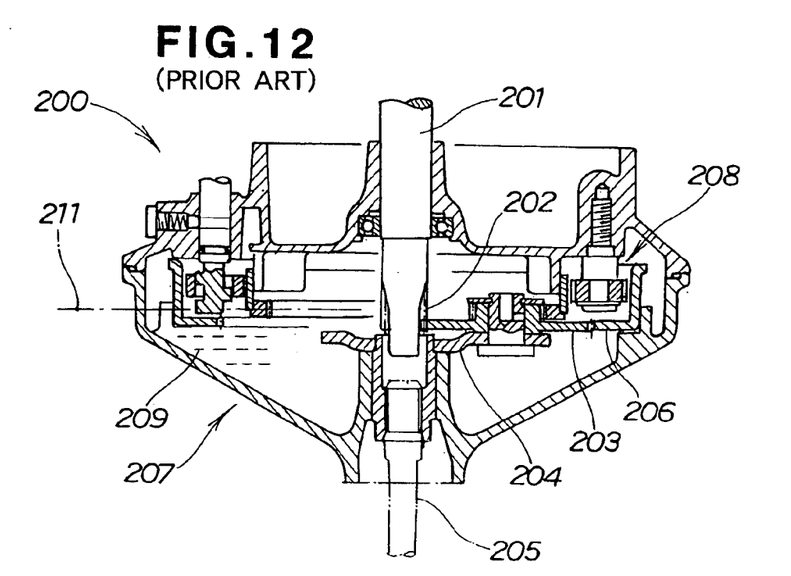
FIG. 12 is a side view of a conventional power transmitting apparatus.
Figure 13:
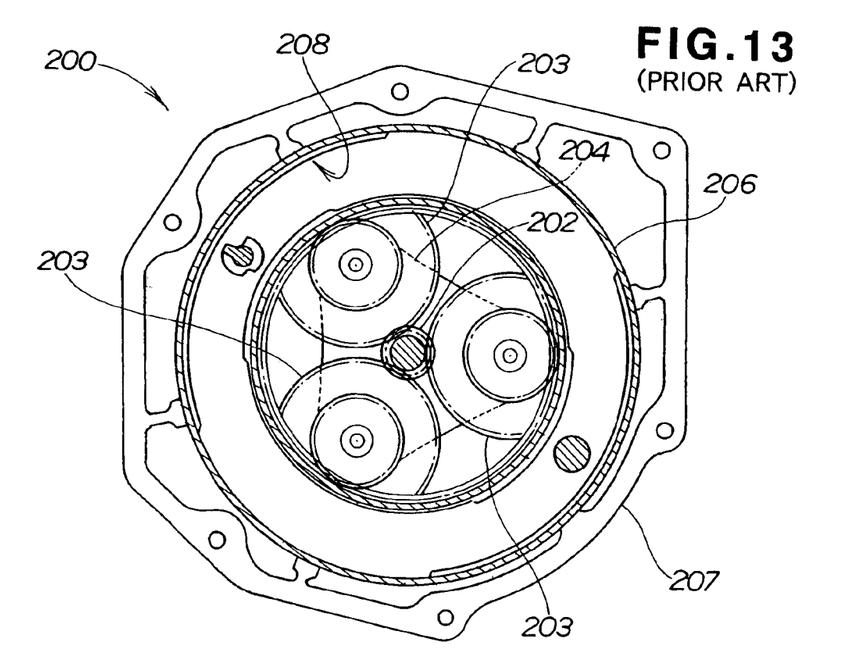
FIG. 13 is a plan view of the conventional power transmitting apparatus.

FIGS. 12 and 13 are views showing such a power transmitting apparatus disclosed in Japanese Utility Model Publication No. SHO-60-40931 (hereinafter referred to as "patent document 1"). As shown, the disclosed power transmitting apparatus 200 includes a vertical input shaft 201, a sun gear 202 provided on an lower end portion of the input shaft 201, and three planetary gears 203 meshing with the sun gear 202. The power transmitting apparatus 200 further includes a gear support member 204 disposed beneath the planetary gears 203 for supporting thereon the planetary gears 203, an output shaft 205 extending downward from the gear support member 204 in axial alignment with the input shaft 201, and a ring gear 206 surrounding and meshing with the planetary gears 203. The power transmitting apparatus 200 also includes a casing 207 supporting therein the gear support member 204, output shaft 205 and ring gear 206, and a brake unit 208 interposed between the casing 207 and the ring gear 206 for braking the ring gear 206 as instructed by a human operator. When the brake unit 208 is in the braking state, power input via the input shaft 201 is transmitted to the output shaft 205 with a reduced speed, while, when the brake unit 208 is in the non-braking state to allow the ring gear 206 to run idle, the input power is prevented from being transmitted from the input shaft 201 to the output shaft 205.

Further, in the disclosed power transmitting apparatus 200, lubricating oil 209 is stored to a predetermined level in the casing 207, and a surface level 211 of the lubricating oil 209 is set such that the meshing portions of the planetary gears 203 and ring gear 206 are completely immersed in the oil 209.

Generally, in the power transmitting apparatus of the type as disclosed in the patent document 1, slight power transmission from the input shaft 201 to the output shaft 205 would take place even when the brake unit 208 is in the non-braking state to allow the ring gear 206 to run idle. Such slight power transmission from the input shaft 201 to the output shaft 205 in the non-braking state is commonly called "corotation". It is known that the corotation occurs due to given force acting to keep the ring gear 206 stationary even when the brake unit 208 has released the ring gear 206 into an idling state. However, because the corotation causes the input power to be transmitted to the output shaft 205 when the input power is not to be transmission to the output shaft 205, it is an unwanted phenomenon for the power transmitting apparatus 200 which should be minimized.

Further, in the conventional power transmitting apparatus 200, the gear support 204 can not always rotate in a stabilized manner because it is substantially triangular in shape and supported at the center of the casing 207.

SUMMARY OF THE INVENTION

In view of the foregoing prior art problems, it is an object of the present invention to provide a power transmitting apparatus which can not only minimize unwanted corotation but also rotate a gear support member in a stabilized manner.

In order to accomplish the above-mentioned object, the present invention provides an improved power transmitting apparatus of the type which comprises: a vertical input shaft; a sun gear provided on a lower portion of the input shaft; a plurality of planetary gears meshing with the sun gear; a flat gear support member disposed under the planetary gears for rotatably supporting thereon the planetary gears; an output shaft extending downward from the gear support member in axial alignment with the input shaft; a ring gear surrounding the planetary gears; a casing surrounding the ring gear, planetary gears, gear support member and sun gear, the ring gear being rotatably mounted on the casing, lubricating oil being stored to a predetermined level in the casing; and a brake unit interposed between the casing and the ring gear for braking the ring gear. When the brake unit is in a braking state to engage the ring gear, power input via the input shaft is transmitted to the output shaft with a reduced speed, while, when the ring gear is in a non-braking state to disengage or allow the ring gear to run idle, the power input via the input shaft is prevented from being transmitted to the output shaft. In the present invention, the flat gear support member has an outer diameter greater than the pitch circle of the ring gear, so as to increase viscous resistance produced by the lubricating oil. As a result, the present invention can effectively lower the degree of the unwanted corotation.

Further, with the arrangement that the surface level of the lubricating oil stored in the casing is set to be below the ring gear but above the gear support member, the present invention can appropriately reduce or optimize resistance to the ring gear produced by the lubricating oil. As a result, the ring gear is allowed to run idle with an increased ease, so that the degree of the corotation can be reduced even more effectively.

In an embodiment of the present invention, the gear support member has at least one hole formed for scattering the lubricating oil onto the teeth of the planetary gears and/or ring gear. Thus, only when the gear support member is rotating, the surface level of the lubricating oil in the casing can be raised and the oil can be scattered through the hole to the teeth of the planetary gear and/or ring gear. As a consequence, the necessary amount of the lubricating oil in the casing can be reduced, and the thus-reduced amount can effectively prevent unnecessary lubricating oil from being sprayed onto the brake unit and the like.

In an embodiment, the present invention also includes a resilient clip resiliently fitted on one of the output shaft and the gear support member, and the resilient clip has at least one end supported by the casing in such a manner that, when the gear support member and output shaft are rotating, the resilient clip slides along the gear support member or output shaft slides so that the frictional resistance to the gear support member and output shaft can be increased via the resilient clip. The arrangement that the resilient clip has at least one end supported by the casing can simplify the structure of the casing and thereby reduce the cost of the power transmitting apparatus.

In an embodiment, the casing has, on a bottom thereof, a frictional surface for sliding contact with the lower surface of the gear support member, in order to impart increased frictional resistance to the gear support member. As a result, the frictional resistance to the gear support member can be made greater than that to the ring gear, so that the corotation can be reduced even more effectively. Also, the frictional surface held in sliding contact with the lower surface of the gear support member functions to stabilize the rotation of the gear support member. Consequently, the sun gear, planetary gears and ring gear can mesh with each other in a stabilized manner, which can thereby not only achieve an enhanced power transmission efficiency among the gears but also minimize unwanted sound produced by the power transmitting apparatus.

In an embodiment, the gear support member has a shape of a disk, which can even further stabilize the rotation of the gear support member.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
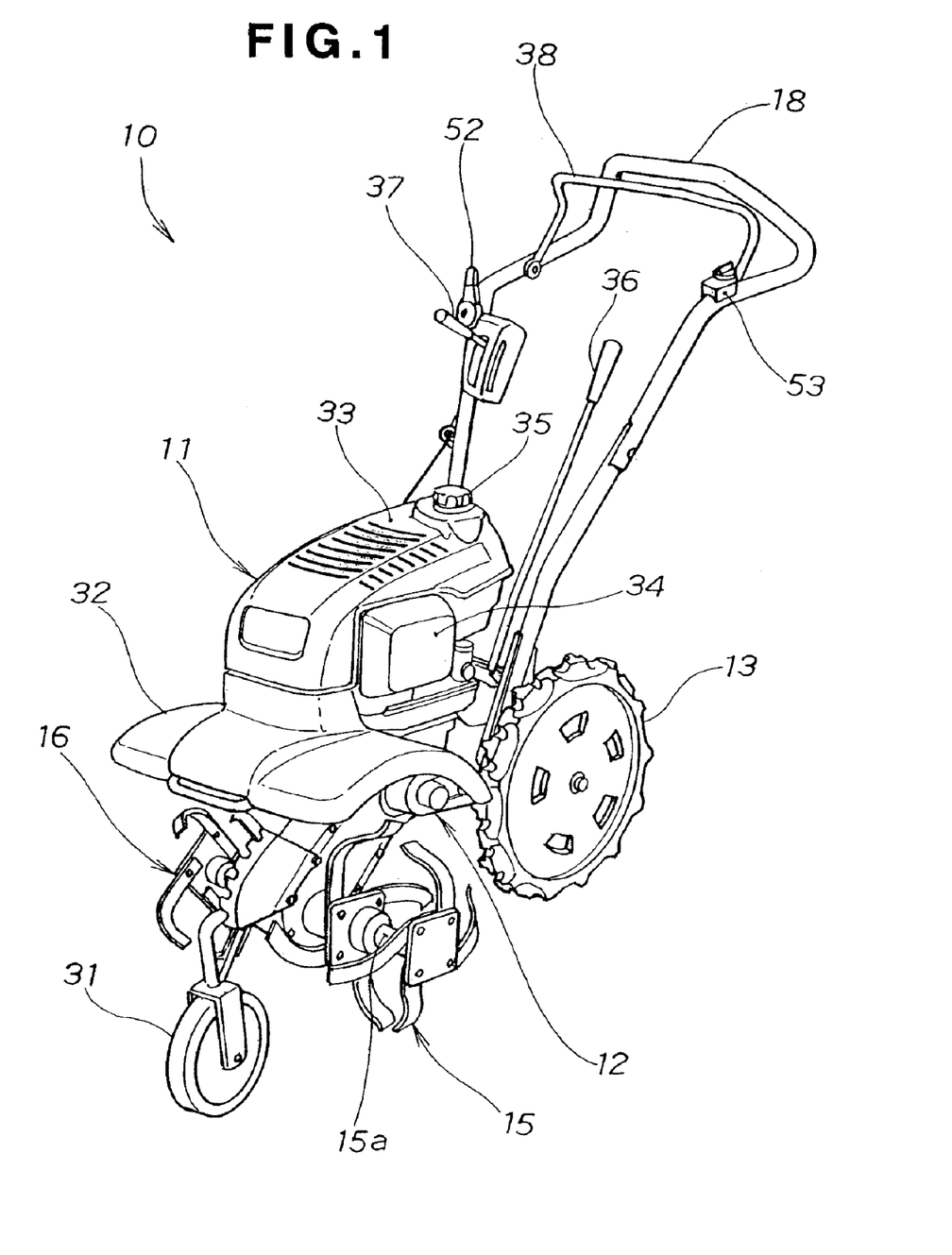
FIG. 1 is a perspective view of a walk-behind agricultural working machine which is provided with a power transmitting apparatus in accordance with a first embodiment of the present invention.

Initial reference is made to FIG. 1 showing in perspective a walk-behind agricultural working machine which is provided with a power transmitting apparatus in accordance with a first embodiment of the present invention. The agricultural working machine 10 includes left and right traveling wheels 13 and 14 (only the left traveling wheel 13 is shown in the figure), left and right cultivator devices 15 and 16 disposed in front of the left and right traveling wheels 13 and 14, and an engine 11 for driving the traveling wheels 13 and 14 and cultivator devices 15 and 16 via a power transmission unit 12. Auxiliary working device (i.e., machine-drawn working device), such as a ridger or ridge forming device, is connected to a rear portion of the power transmission unit 12. With such arrangements, the agricultural working machine 10, for example, forms ridges by means of the ridger while cultivating a field by means of the cultivator devices 15 and 16.

Figure 2:
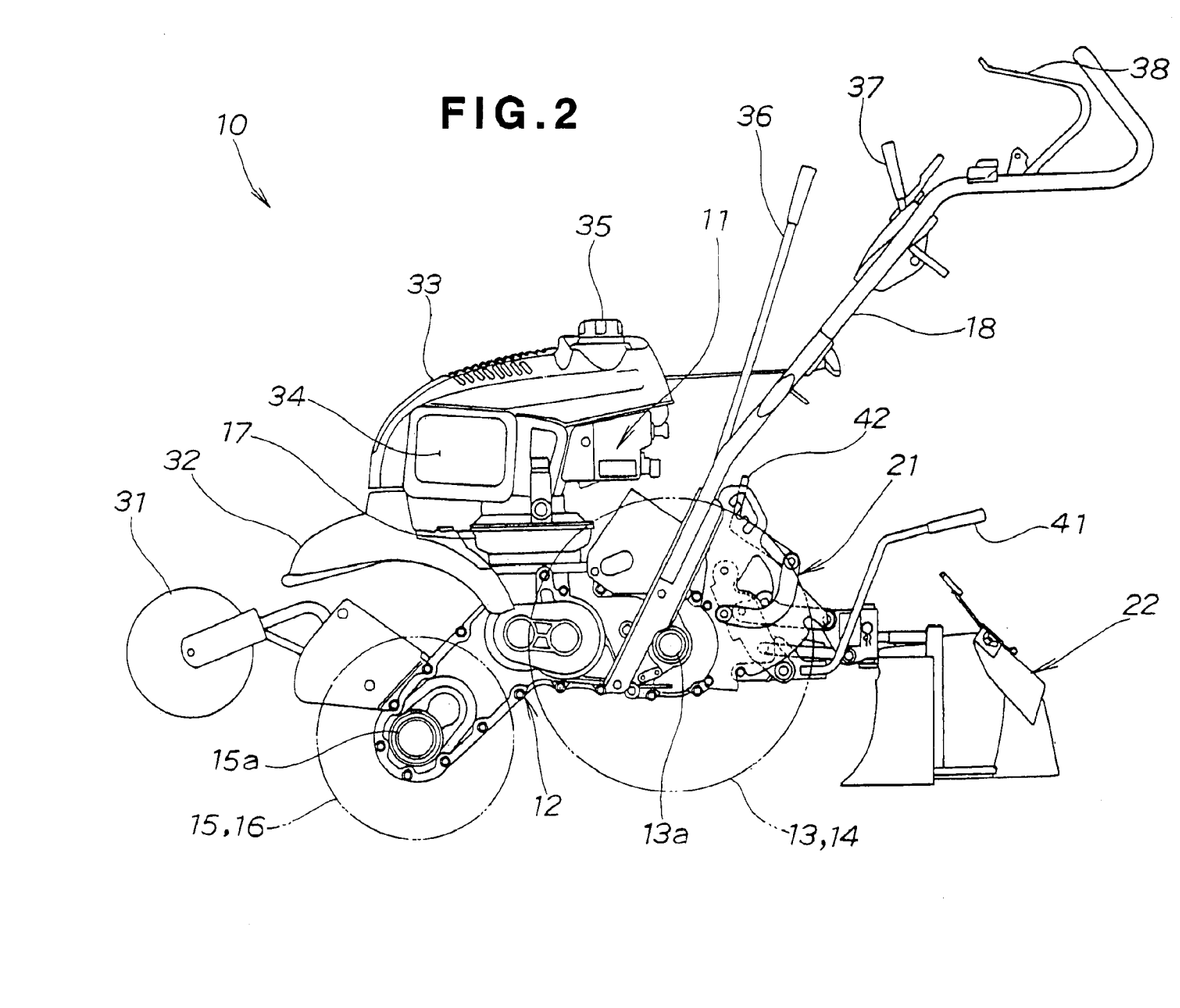
FIG. 2 is a side view of the agricultural working machine provided with the power transmitting apparatus.

FIG. 2 is a side view of the agricultural working machine 10 provided with the power transmitting apparatus of the present invention, which particularly shows the engine 11 disposed within an upper portion of the machine body, the power transmission unit 12 disposed below the engine 11 with a clutch (i.e., brake unit of the inventive power transmitting apparatus) interposed therebetween, the cultivator devices 15 and 16 rotatably connected to a front portion of the power transmission unit 12 via left and right cultivating shafts 15a and 16a (only the left cultivating shaft 15a is shown in the figure) and the traveling wheels 13 and 14 rotatably mounted to a rear portion of the power transmission unit 12 via left and right axles 13a and 14a (only the left axle 13a is shown in the figure). The agricultural working machine 10 also includes an operating handle 18 extending obliquely in a rearward and upward direction from a rear end portion of the power transmission unit 12, and a connection mechanism 21 secured to the rear end of the transmission unit 12. Reference numeral 17 represents a clutch case (i.e., casing of the inventive power transmitting apparatus).

The agricultural working machine 10 also includes an auxiliary traveling wheel 31 secured to a front end portion of the power transmission unit 12 in such a manner that the wheel 31 is vertically adjustable in position, a fender 32 covering upper portions of the power transmission unit 12 and cultivator devices 15 and 16, an engine cover 33 covering an upper portion of the engine 11, an air cleaner 34, and a filler cap 35 for openably closing a fuel tank. The agricultural working machine 10 further includes a transmission shift lever 36, a differential lock (diff lock) lever 37, a clutch lever 38, a shift lever 41 operable for raising the machine-drawn working device (e.g., ridger 22) to an inoperative position, and a sunk-down position adjustment lever 42 operable for adjusting a position of the machine-drawn working device sunk down in soil (i.e., sunk-down position of the machine-drawn working device).

Figure 3:
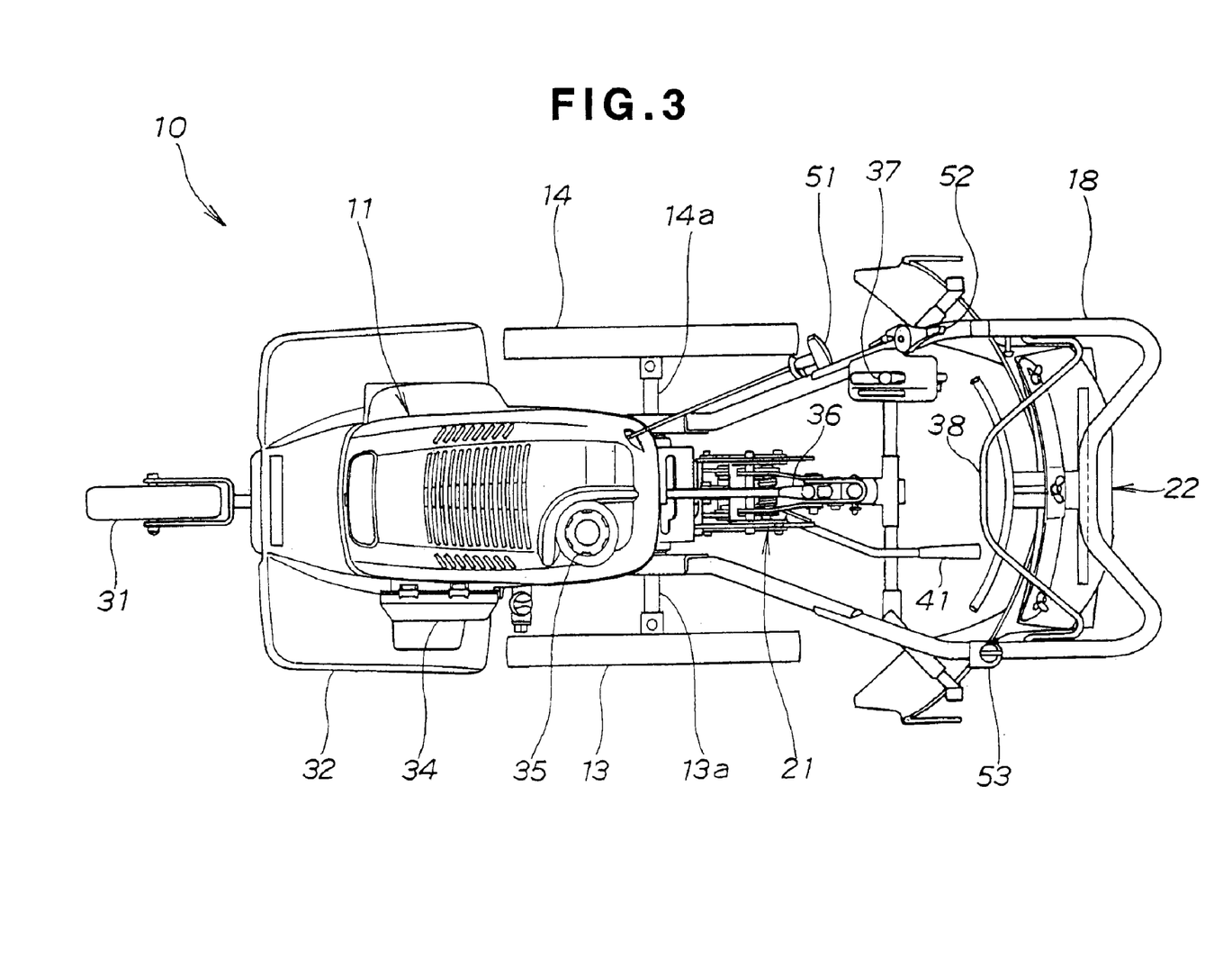
FIG. 3 is a top plan view of the agricultural working machine provided with the power transmitting apparatus.

FIG. 3 is a top plan view of the agricultural working machine 10 provided with the power transmitting apparatus of the present invention. As shown, the agricultural working machine 10 further includes a recoil starter knob 51 for activating the engine 11 and a throttle lever 52 for adjusting an output of the engine 11, and these knob 51 and lever 52 and the above-mentioned diff lock lever 37 are positioned on a right front portion of the operating handle 18. The agricultural working machine 10 further includes an engine switch 53 provided on a left rear portion of the handle 18 for deactivating the engine 11, and a clutch lever 38 extending horizontally between opposed rear regions of the operating handle 18. As further shown in the figure, the transmission shift lever 36 extends rearwardly (i.e., toward the human operator) from a middle region of the rear end of the power transmission unit 12 (FIG. 1), and the shift lever 41 extends rearwardly from a rear left portion of the connection mechanism 21.

Figure 4:
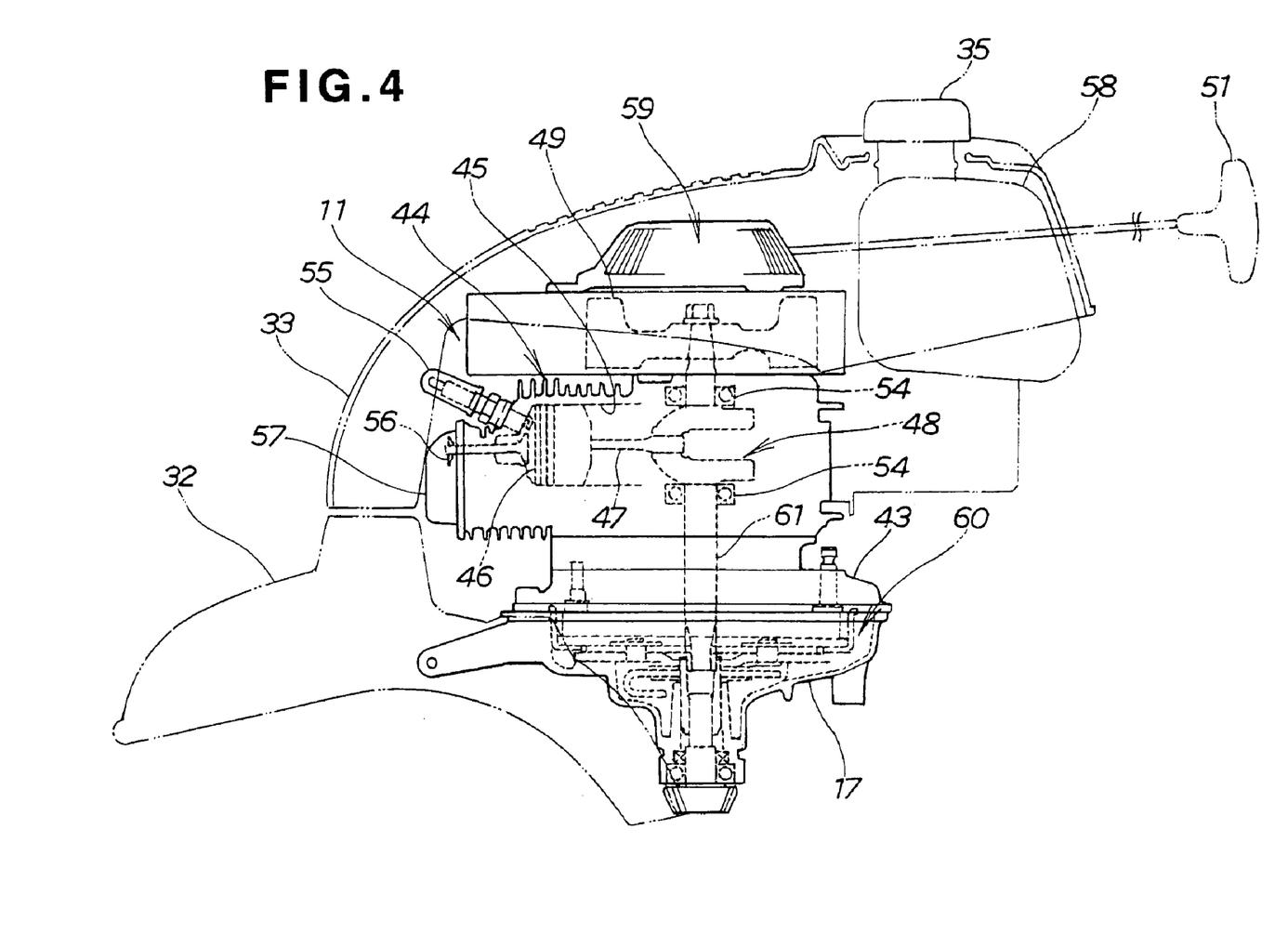
FIG. 4 is a side view of an engine connected to the power transmitting apparatus and other components provided around the engine.

FIG. 4 is a side view of the engine 11 connected to the power transmitting apparatus 60 of the present invention and other components around the engine 11.

The engine 11 includes, as its principal components, a crank case 43 formed of an aluminum alloy, a cylinder block 44 bolted to the crank case 43 via a gasket (not shown), a piston 46 reciprocatively slidable within a cylinder 45 provided in the cylinder block 44, and a crankshaft 48 connected with the piston 46 via a piston rod 47. Fly wheel 49 is connected to one end of the crankshaft 48. The other end portion of the crankshaft 48 constitutes an input shaft 61 of the power transmitting apparatus 60 of the present invention.

In the figure, bearings 54 rotatably support the crankshaft 48. Reference numeral 55 represents a spark plug, 56 an intake (exhaust) valve, 57 a head cover, 58 a fuel tank, and 59 a recoil starter.

Figure 5:
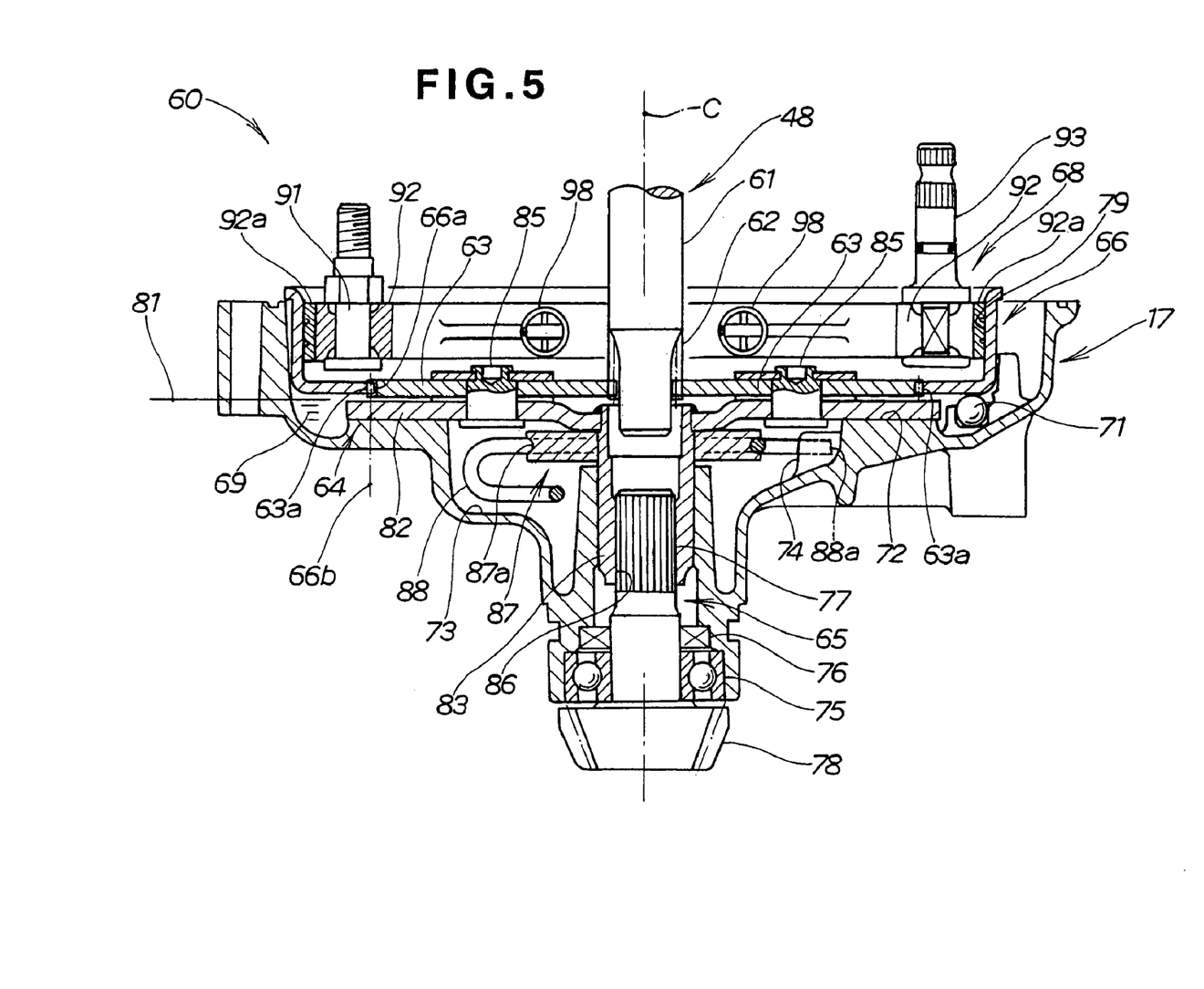
FIG. 5 is a sectional side view of the power transmitting apparatus.

FIG. 5 is a sectional side view of the power transmitting apparatus 60 of the present invention.

As shown, the power transmitting apparatus 60 includes the input shaft 61 (i.e., the other end portion of the crankshaft 48) positioned along a vertical line C, a sun gear 62 formed on a lower end portion of the input shaft 61, at least three planetary gears 63 meshing with the sun gear 62, and a flat disk-shaped gear support member 64 provided under the planetary gears 63 for rotatably supporting thereon the planetary gears 63. The power transmitting apparatus 60 also includes an output shaft 65 rotatably supported in the casing 17, connected with the gear support member 64 and extending downward from the gear support member 64 in axial alignment with the input shaft 61, and a ring gear 66 surrounding and meshing with the planetary gears 63 and rotatably mounted on the casing 17. The power transmitting apparatus 60 further includes the brake (clutch) unit 68 for preventing or permitting rotation of the ring gear 66 as instructed, for example, by the human operator, the casing 17 covering the sun gear 62, planetary gears 63, gear support member 64 and ring gear 66, and lubricating oil 69 is stored up to a predetermined level in the casing 17.

The casing 17 includes a plurality of steel bearing balls 71 (only one of which is shown) rotatably supporting thereon the ring gear 66, and the casing 17 has a frictional surface 72 that is formed on a bottom 73 of the casing 17 and held in sliding contact with the lower surface of the gear support member 64 so as stabilize the rotation of the gear support member 64 and increase frictional resistance to the gear support member 64. The casing 17 also includes a locking rib 74 for locking one end 88a of a resilient clip 88 to be later detailed, a ball bearing 75 rotatably supporting the output shaft 65, and an oil seal 76 for preventing leakage of the lubricating oil 69.

The output shaft 65, extending in axial alignment with the input shaft 61, has a male spline member 77 provided on its one end portion for attachment to the gear support member 64, and a bevel gear 78 provided on its other end portion for transmitting power to the power transmission device 12 of FIG. 1.

The ring gear 66 includes a brake drum 79 constituting a part of the brake unit 68. Surface level of the lubricating oil 69 is set to be below the ring gear 66 or planetary gears 63, but above the gear support member 64.

The gear support member 64 includes a disk-shaped support plate 82, and a center boss 83 extending from the underside of the support plate 82 and coupled with the output shaft 65. Outer diameter of the gear support member 64 (specifically, the disk-shaped support plate 82) is greater than a pitch circle 66b of the ring gear 66. Namely, the outer diameter of the gear support member 64 is set to be at least greater than an imaginary circle passing radially outermost pints of support shafts 85 of the planetary gears 63.

The support plate 82 has the support shafts 85 for rotatably supporting the corresponding planetary gears 63. The center boss 83 has a female spline member 86 meshing with the male spline member 77 of the output shaft 64 to securely attach the output shaft 85 to the support plate 82, and a pulley 87 is provided on an upper end portion of the boss 83 so as to impart increased frictional resistance to the gear support member 64. The above-mentioned resilient clip 88, having a substantial U shape, is resiliently fitted in a groove 87a formed in the outer periphery of the pulley 87.

The brake unit 68 is interposed between the casing 17 and the ring gear 66, so as to brake the ring gear 66 as desired. Namely, the brake unit 68 prevents or permits the rotation of the ring gear 66 in response to an instruction of the human operator. When the brake unit is in the braking state, the power from the input shaft 61 is transmitted to the output shaft 65 with a reduced speed, while, when the brake unit is in the non-braking state, the ring gear 66 is caused to run idle so as not to transmit the power from the input shaft 61 to the output shaft 65.

In the power transmitting apparatus 60 which comprises a combination of the sun, planetary and ring gears 62, 63 and 66 and the brake unit 68 capable of switching between the power-transmitting mode and the non-power-transmitting mode, slight corotation would take place even when the brake unit 68 is in the non-braking state to allow the ring gear 66 to run idle, as is the case with the above-discussed conventional power transmitting apparatus. It is preferable that such corotation be minimized.

With the outer diameter of the flat disk-shaped gear support member 64 set to be greater than the pitch circle 66b of the ring gear 66 as mentioned above, the instant embodiment of the present invention can increase viscous resistance produced by the lubricating oil 69 and thereby effectively lower the degree of the corotation.

Further, with the arrangement that the surface level 81 of the lubricating oil 69 stored in the casing 17 is set to be below the ring gear 66 or planetary gears 63 but above the gear support member 64, the instant embodiment can appropriately reduce or optimize resistance to the ring gear 66 produced by the lubricating oil 69. As a result, the embodiment allows the ring gear 66 to run idle with an increased ease, so that the degree of the corotation can be effectively reduced.

Figure 6:
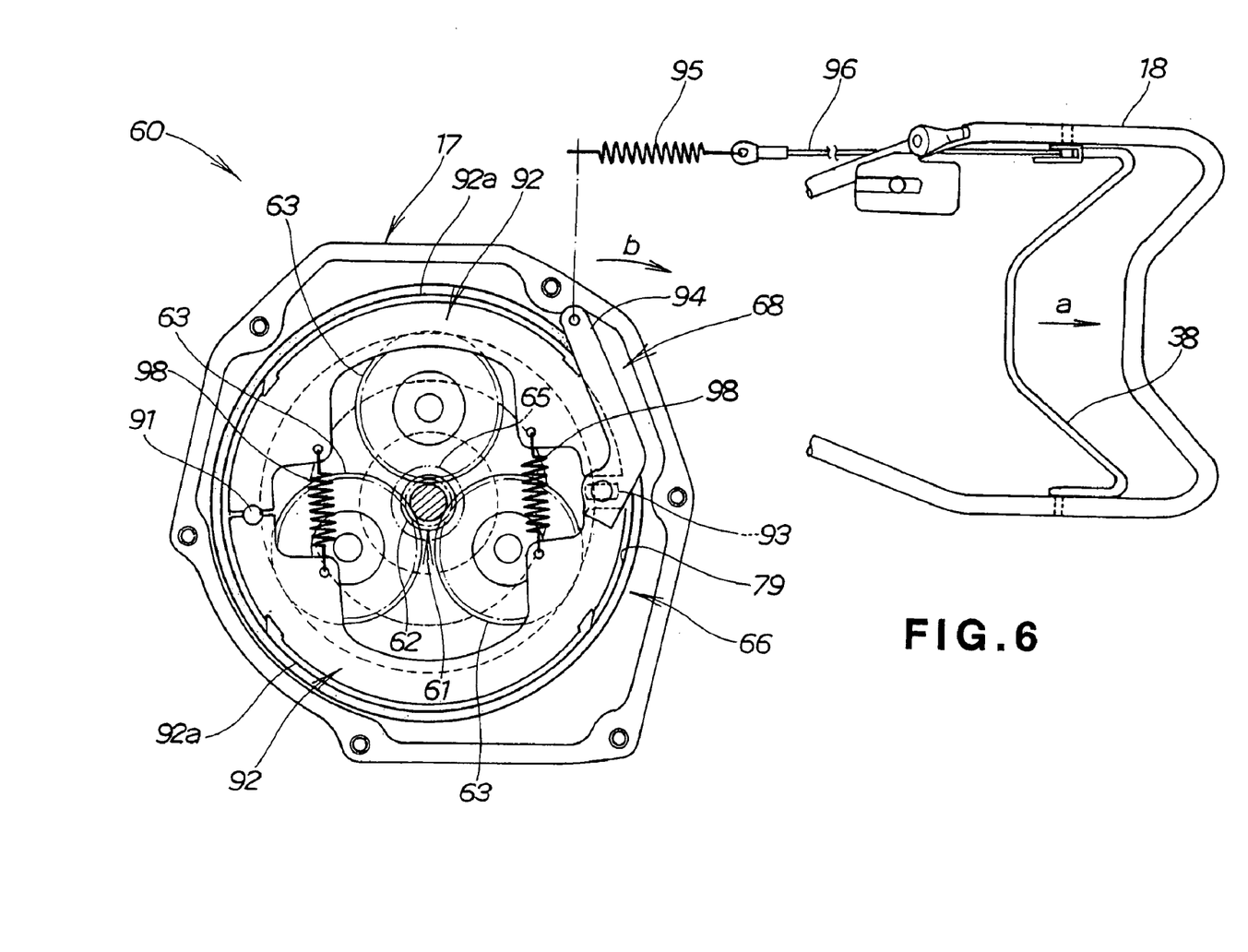
FIG. 6 is a view explanatory of a brake unit in the power transmitting apparatus.

FIG. 6 is a view explanatory of the brake unit 68 in the power transmitting apparatus 60.

The brake (clutch) unit 68 includes an anchor pin 91 provided on the casing 17, a pair of brake shoes 92 supported via the anchor pin 91, and a brake drum 79 provided on the ring gear 66 for abutting engagement with the brake shoes 92. The rake unit 68 also includes return springs 98 normally urging the brake shoes 92 toward each other, an actuating cam 93 for pressing the brake shoes 92 apart from each other against the bias of the return springs 98, a cam lever 94 connecting to the actuating cam 93, and a cable 96 connected at its one end to the cam lever 94 via a buffer spring 95 and connected at the other end to the clutch lever 38. Each of the brake shoes 92 has a brake pad 92a for abutting engagement with the ring gear 66.

When the input power should be transmitted from the input shaft 62 via the gear support member 64 to the output shaft 65, the clutch lever 38 is pulled toward the operating handle 18 as indicated by arrow "a" so that the cam lever 94 is turned, as indicated by arrow "b", to cause the actuating cam 93 to press the brake shoes 92 apart from each other. Thus, the brake shoes 92 are tightly pressed against the brake drum 79 (ring gear 66) to place the ring gear 66 in an engaged state, so that the input power can be delivered to the output shaft 65 by rotation of the gear support member 64. On the other hand, when the input power should be prevented from being transmitted from the input shaft 62 via the gear support member 64 to the output shaft 65, the clutch lever 38 is released to disengage the brake shoes 92 from the brake drum 79 (ring gear 66) and thereby causes the ring gear 66 to run idle so that the input power is prevented from being delivered to the gear support member 64.

Figure 7:
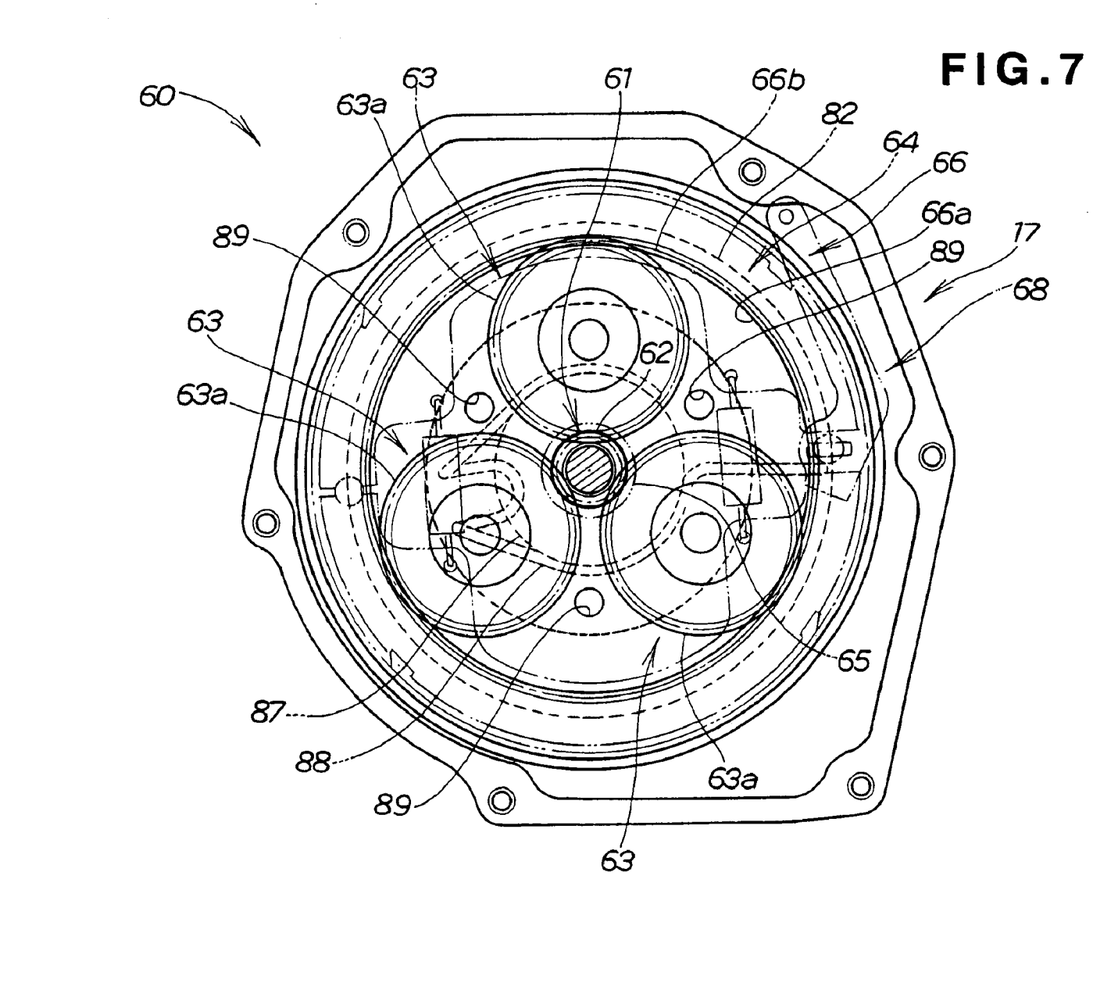
FIG. 7 is a top plan view of the power transmitting apparatus.

FIG. 7 is a top plan view of the power transmitting apparatus 60. A plurality of holes 89 are formed through the thickness of the gear support member 64 such that, during rotation of the support member 64, the lubricating oil 69 within the casing 17 is agitated and scattered through the holes 89 onto the teeth 63a, 66a of the planetary gears 63 and/or ring gear 66.

Thus, only when the gear support member 64 is rotating, the surface level 81 of the lubricating oil 69 (see FIG. 5) can be raised and the oil 69 can be scattered (or supplied) through the holes 69 to the teeth 63a, 66a of the planetary gear 63 and/or ring gear 66. As a consequence, the necessary amount of the lubricating oil 69 can be reduced, and the thus-reduced amount can effectively prevent unnecessary lubricating oil 69 from being sprayed onto the brake unit 68 and the like.

The following paragraphs describe fundamental operation of the sun gear 62 (i.e., input shaft 61), planetary gears 63, ring gear 66 and gear support member 64 (i.e., output shaft 65) when the brake unit 68 is in the braking state, namely, when the corotation problem is not encountered.

Figure 8A:
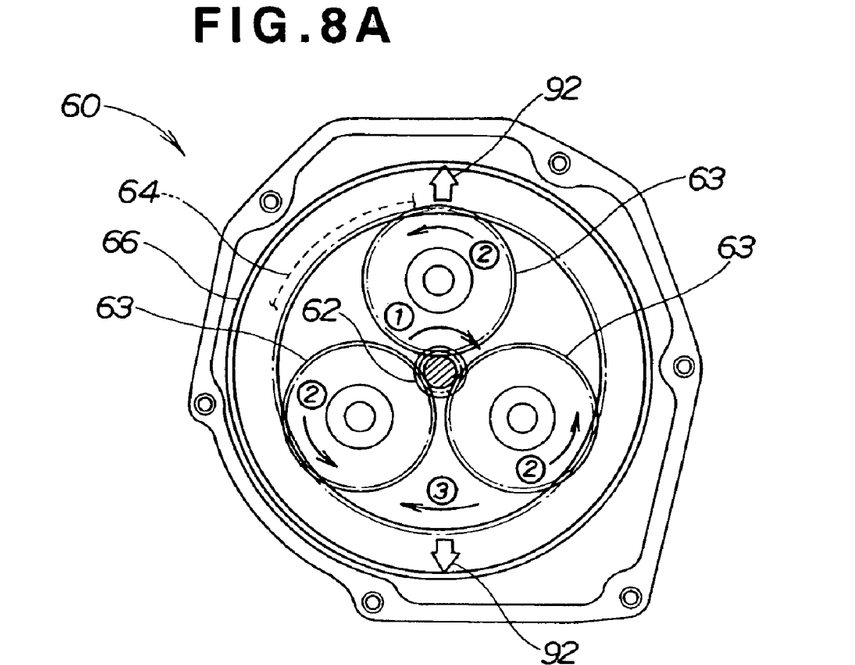
FIGS. 8A and 8B are view explanatory of behavior of the power transmitting apparatus.
Figure 8B:
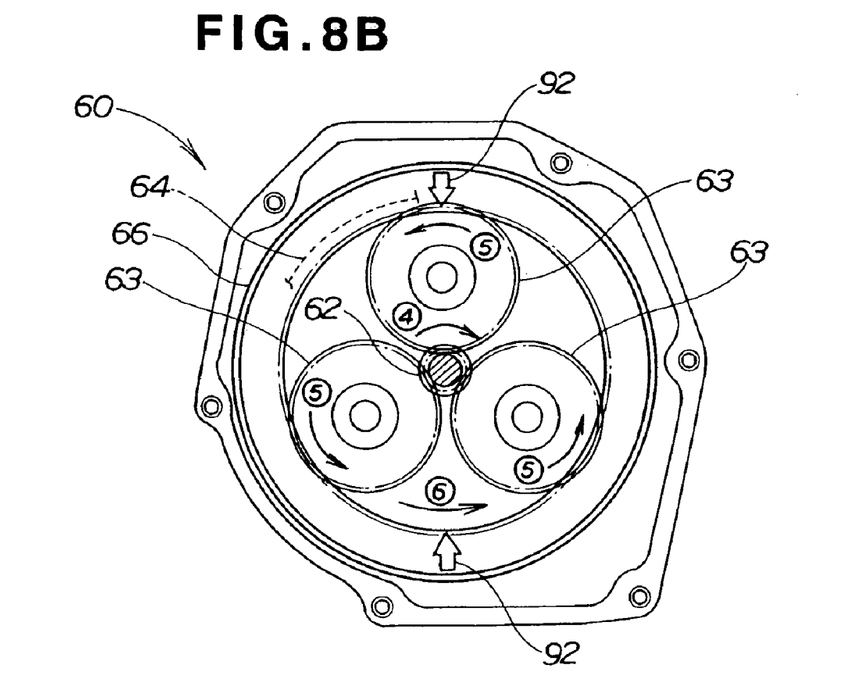

FIGS. 8A and 8B are view explanatory of behavior of the inventive power transmitting apparatus 60.

As shown in FIG. 8A, the brake shoes 92 are pressed against the ring gear 66, as denoted by outward white arrows, so that the ring gear 66 is locked or placed in the engaged state. Then, as the sun gear 62 is rotated as indicated by arrow ①, the planetary gears 63 are rotated as indicated by arrows ②. Because the ring gear 66 is currently in the engaged state as noted above, the gear support member 64 is rotated as indicated by arrow ③ as the planetary gears 63 are rotated as indicated by arrows ②, so that the input power can be transmitted to the output shaft 65 secured to the gear support member 64 (see FIG. 5).

In FIG. 8B, the brake shoes 92 are retracted from the ring gear 66, as denoted by inward white arrows, so that the ring gear 66 is unlocked or placed in a disengaged or idling state. Then, as the sun gear 62 is rotated as indicated by arrow ④, the planetary gears 63 are rotated as indicated by arrows ⑤. Because the ring gear 66 is currently in the idling state and thus capable of rotating freely, the ring gear 66 may rotate as indicated by arrow ⑥ as the planetary gears 63 are rotated as indicated by arrow ⑤, so that the input power is not transmitted to the output shaft 65.

Figure 9A:
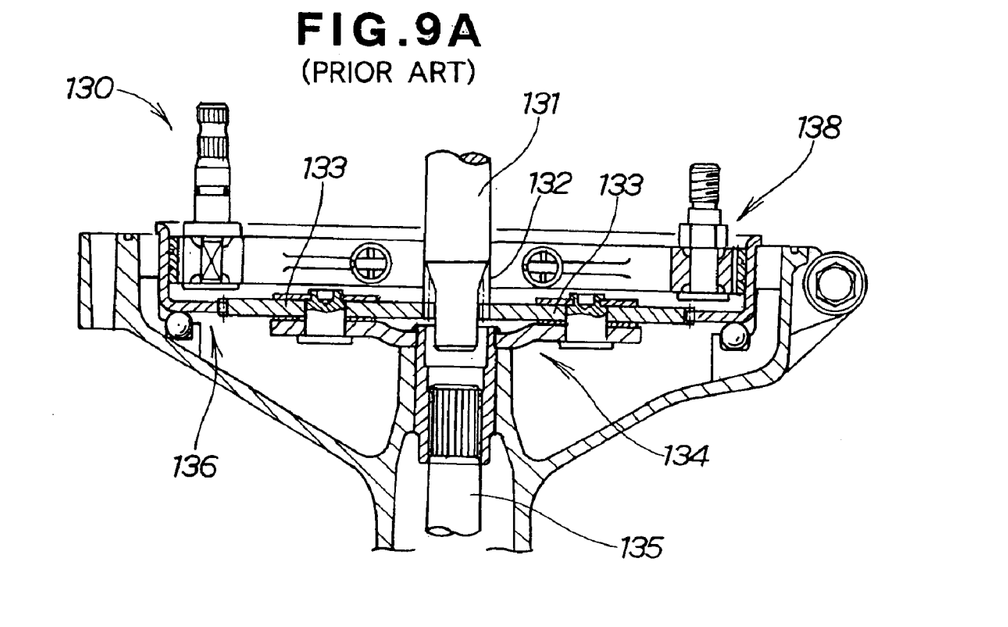
FIGS. 9A and 9B are view further explanatory of the behavior of the power transmitting apparatus.
Figure 9B:
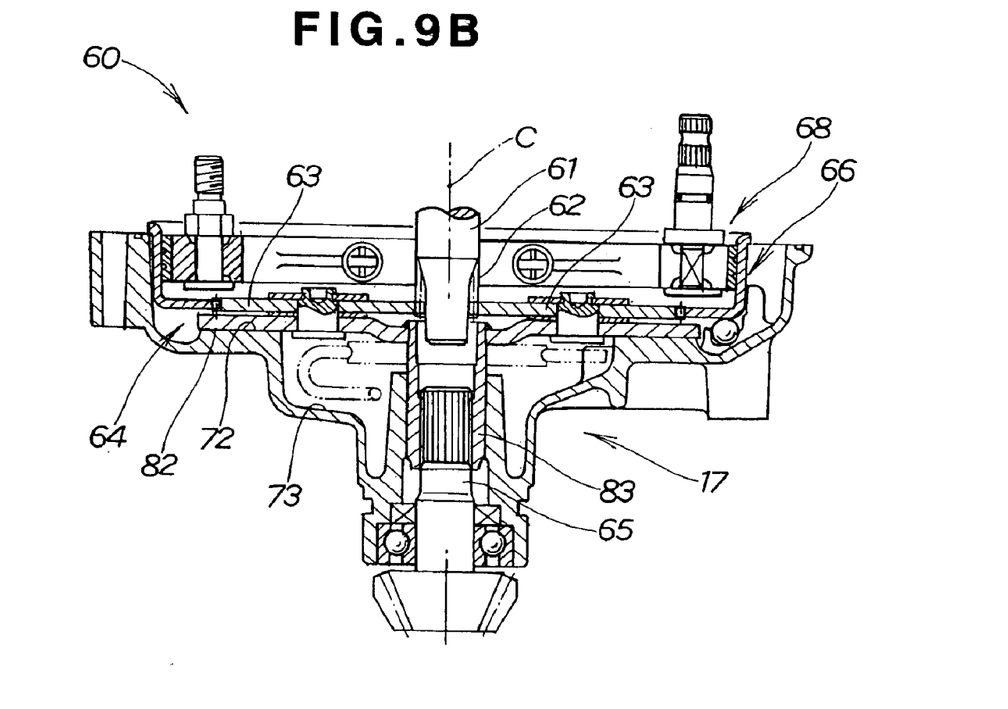

FIGS. 9A and 9B are view further explanatory of the behavior of the power transmitting apparatus 60. Specifically, FIG. 9A shows a conventional power transmitting apparatus 130 similar to the one discussed above in relation to FIGS. 12 and 13, while FIG. 9B shows the inventive power transmitting apparatus 60.

The conventional power transmitting apparatus 130 is of the type which comprise a combination of sun, planetary and ring gears 132, 133 and 136 rotatably mounted on a gear support member 134 and a brake unit 138 capable of switching between a power-transmitting mode and a non-power-transmitting mode. In this apparatus 130, slight corotation would undesirably take place even when the brake unit 138 is in the non-braking state to allow the ring gear 136 to run idle and thereby prevent input power from being transmitted from an input shaft 131 to an output shaft 135.

The inventive power transmitting apparatus 60 is constructed to minimize the corotation in the following manner.

Namely, as illustrated in FIG. 9B, the bottom 73 of the casing 17 has the frictional surface 72 held in sliding contact with the underside of the gear support member 64, so as to increase frictional contact to the gear support member 64. As a consequence, the frictional resistance to the gear support member 64 can be made greater than that to the ring gear 66, which can reduce the corotation.

Also, the frictional surface 72 held in sliding contact with the lower surface of the gear support member 64 functions to stabilize the rotation of the gear support member 64. Consequently, the sun gear 62, planetary gears 63 and ring gear 66 can mesh with each other in a stabilized manner, which can thereby not only achieve an enhanced power transmission efficiency among the gears 62, 63 and 66 but also minimize unwanted sound produced by the power transmitting apparatus 60.

Figure 10A:
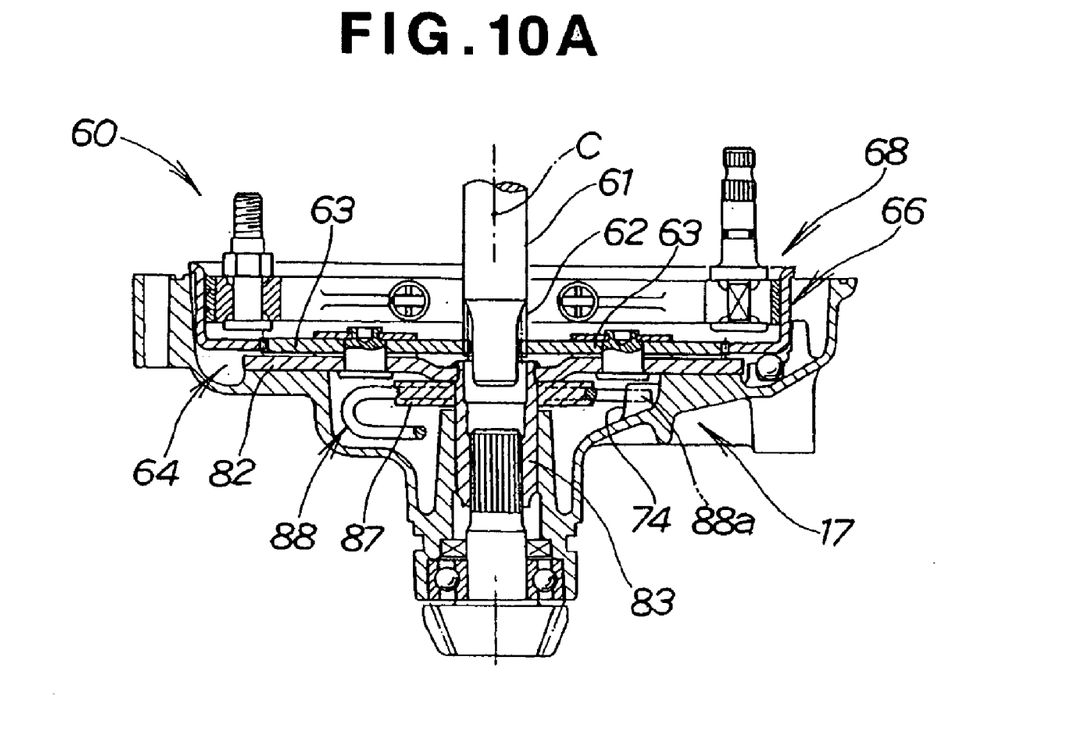
FIGS. 10A and 10B are view further explanatory of the power transmitting apparatus.
Figure 10B:
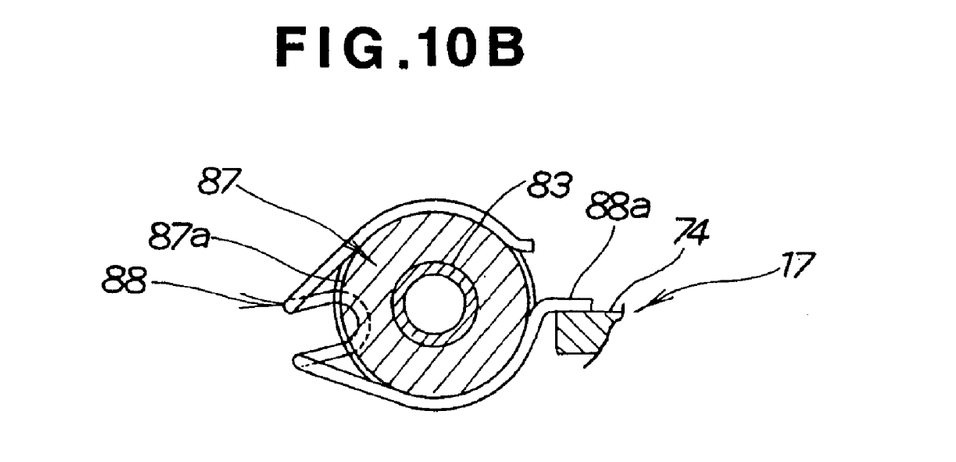

FIGS. 10A and 10B are view further explanatory of the power transmitting apparatus 60 of the present invention. As shown, the pulley 87 is mounted on the output shaft 65 or gear support member 64, and the U-shaped resilient clip 88 is resiliently fitted in the peripheral groove 87a in the pulley 87. With the resilient clip 88 having its end 88a supported by the casing 17, it is possible to prevent the corotation of the output shaft 65 in the non-braking state where the ring gear 66 is allowed to run idle.

As best seen in FIG. 10C, the pulley 87 is preferably mounted on the center boss 83 of the gear support member 64, the end 88a of the resilient clip 88, resiliently fitted in the peripheral groove 87a of the pulley 87, is supported by the locking rib 74 of the casing 17. When the gear support member 64 and output shaft 65 rotate, the resilient clip 88 slides along the pulley 87, thus imparting increased frictional resistance to the gear support member 64 and output shaft 65. As a consequence, the frictional resistance to the gear support member 64 can be made greater than that to the ring gear 66, which can effectively reduce the corotation. Further, with the arrangement that one of the opposed ends 88a of the resilient clip 88 is supported by the locking rib 74 of the casing 17, it is possible to simplify the structure of the casing 17 and thereby reduce the cost of the power transmitting apparatus 60.

Namely, the power transmitting apparatus 60 of the invention can avoid the unwanted corotation without having to complicate the structure of the casing 17.

Figure 11A:
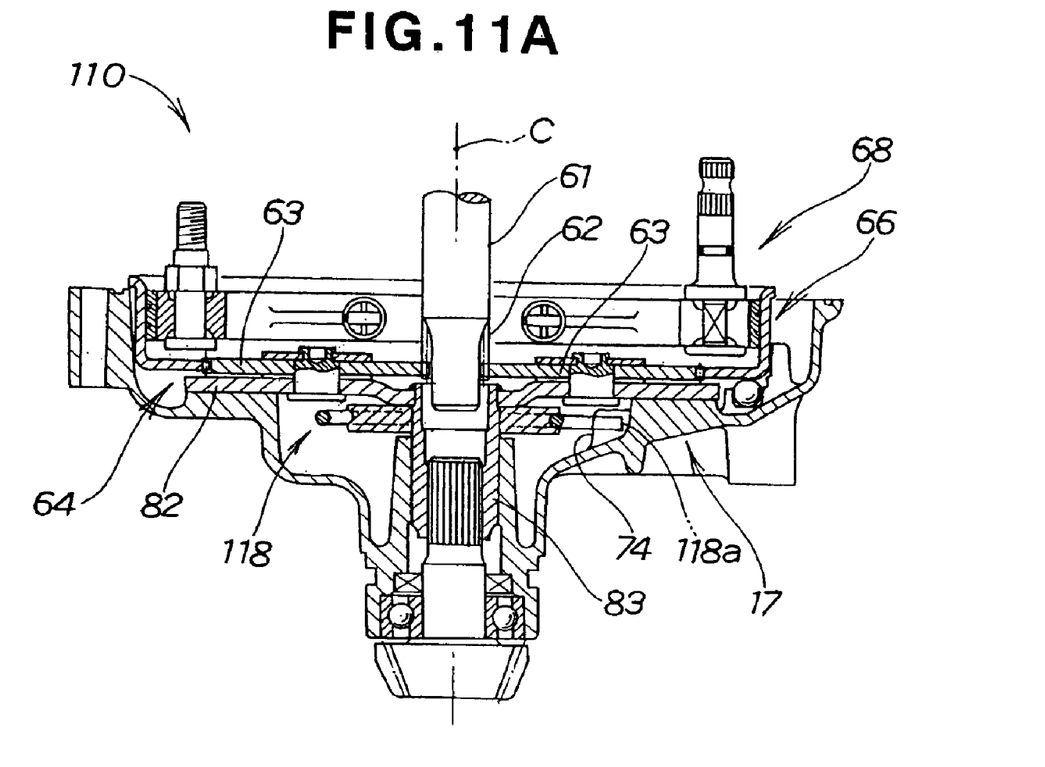
FIGS. 11A–11B are views showing a power transmitting apparatus 110 in accordance with a second embodiment of the present invention.
Figure 11B:
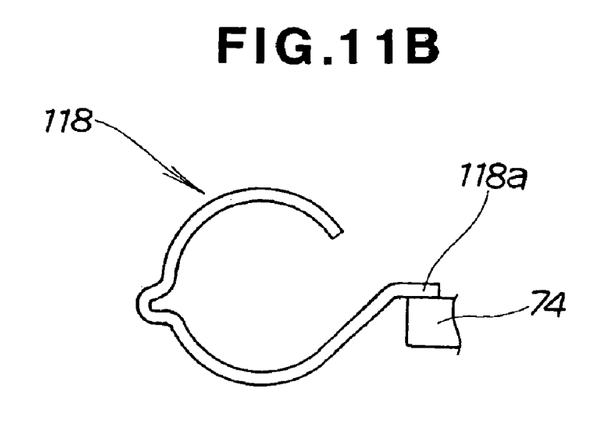

FIGS. 11A–11B are views showing a power transmitting apparatus 110 in accordance with a second embodiment of the present invention, where the same elements as employed in the first embodiment are represented by the same reference numerals and will not be described here to avoid unnecessary duplication.

The second embodiment of the power transmitting apparatus 110 too includes a casing 17, input shaft 61, sun gear 62, planetary gears 63, gear support member 64, output shaft 65, ring gear 66, brake unit 68, lubricating oil 69, steel bearing balls 71, frictional surface 72, locking rib 74, pulley 87 and resilient clip 118. The resilient clip 118, which has a relatively small height or low profile in a direction of a vertical axis C and has a substantial semicircular shape, is resiliently fitted in an outer peripheral groove 87a of the pulley 87. One of opposed ends 118a of the resilient clip 118 is engaged by the locking rib 74 of the casing 17.

FIG. 11B is a plan view of the resilient clip 118 having the substantial semicircular shape. Because of the low profile of the resilient clip 118, the casing 17 in this embodiment can have a reduced depth, so that the overall size of the power transmitting apparatus 110 can be significantly reduced.

The sun gear 62 has been described as being integrally formed on the upper end portion of the input shaft 61 (see FIG. 5); alternatively, the sun gear 62 may be in the form of a separate sun gear mounted on the output shaft 65.

Further, whereas the resilient clip 88 or 118 has been described as resiliently fitted on the pulley 87 mounted on the gear support member 64 (see FIG. 5), the resilient clip 88 or 118 may be directly fitted on the gear support member 64 or output shaft 65. Furthermore, the pulley 87 in the described embodiments is mounted on the gear support member 64 (see FIG. 5); alternatively, the pulley 87 may be integrally formed on the gear support member 64 or output shaft 65.

Furthermore, whereas the resilient clip has been described as having a substantial U shape or semicircular shape (see FIG. 10 or 11), the clip 88 or 118 may be of any other shape as long as it can be resiliently fitted on the pulley 87, gear support member 64 or output shaft 65.

In summary, the present invention arranged in the above-described manner can not only minimize the unwanted corotation but also rotate the gear support member in a stabilized manner.

Obviously, various minor changes and modifications of the present invention are possible in the light of the above teaching. It is therefore to be understood that within the scope of the appended claims the invention may be practiced otherwise than as specifically described.

What is claimed is:

1. A power transmitting apparatus comprising:

a vertical input shaft;

a sun gear provided on a lower portion of said input shaft;

a plurality of planetary gears meshing with said sun gear;

a flat gear support member disposed under said planetary gears for rotatably supporting thereon said planetary gears;

an output shaft extending downward from said gear support member in axial alignment with said input shaft;

a ring gear surrounding said planetary gears;

a casing surrounding said ring gear, planetary gears, gear support member and sun gear, said ring gear being rotatably mounted on said casing, lubricating oil being stored to a predetermined level in said casing; and a brake unit interposed between said casing and said ring gear for braking said ring gear, wherein, when said brake unit is in a braking state, power input via said input shaft is transmitted to said output shaft with a reduced speed, while, when said ring gear is in a non-braking state to allow said ring gear to run idle, the power input via said input shaft is prevented from being transmitted to said output shaft, wherein said flat gear support member has an outer diameter greater than a pitch circle of said ring gear, and the lubricating oil stored in said casing has a surface level set below said ring gear but above said gear support member.

2. A power transmitting apparatus as claimed in claim 1 wherein said gear support member has a hole for scattering the lubricating oil onto teeth of said planetary gears and/or said ring gear.

3. A power transmitting apparatus as claimed in claim 1 which further comprises a resilient clip resiliently fitted on one of said output shaft and said gear support member, and said resilient clip has at least one end supported by said casing so that, when said brake unit is in the non-braking state, frictional resistance to said output shaft can be increased via said resilient clip.

4. A power transmitting apparatus as claimed in claim 3 wherein said casing has, on a bottom thereof, a frictional surface for sliding contact with a lower surface of said gear support member.

5. A power transmitting apparatus as claimed in claim 1 wherein said gear support member has a shape of a disk.

* * * * *